US012716512B2

(12) United States Patent
Ball et al.

(10) Patent No.: US 12,716,512 B2
(45) Date of Patent: Aug. 25, 2026

(54) APPARATUS FOR UTILITY CONTROL

(71) Applicant: WCM Industries, Inc., Colorado Springs, CO (US)

(72) Inventors: William T. Ball, Colorado Springs, CO (US); Gabriel Young, Colorado Springs, CO (US)

(73) Assignee: WCM Industries, Inc., Colorado Springs, CO (US)

(*) Notice: Subject to any disclaimer, the term of this patent is extended or adjusted under 35 U.S.C. 154(b) by 304 days.

(21) Appl. No.: 18/399,121

(22) Filed: Dec. 28, 2023

(65) Prior Publication Data

US 2025/0218700 A1 Jul. 3, 2025

(51) Int. Cl.

| | |
|---|---|
| ***F16K 27/12*** | (2006.01) |
| ***F24C 3/12*** | (2006.01) |
| ***H01H 3/02*** | (2006.01) |
| *E03B 7/09* | (2006.01) |

(52) U.S. Cl.

CPC .............. *F16K 27/12* (2013.01); *F24C 3/124* (2013.01); *H01H 3/0206* (2013.01); *H01H 3/022* (2013.01); *E03B 7/095* (2013.01); *Y10T 137/7043* (2015.04)

(58) Field of Classification Search

CPC ....... H01H 3/0206; F16K 27/12; F16K 31/05; F16K 31/055; E03B 7/095; Y10T 137/7043

USPC ....................................................... 200/61.86

See application file for complete search history.

(56) References Cited

U.S. PATENT DOCUMENTS

| | | | |
|---|---|---|---|
| 1,115,092 | A | 10/1914 | Neahr |
| 1,145,764 | A | 7/1915 | Fuller |
| 2,856,474 | A | 10/1958 | Norris |
| 3,372,251 | A | 3/1968 | Bowman et al. |
| 3,417,212 | A | 12/1968 | Driscoll |
| 3,543,096 | A | 11/1970 | Bedford |
| 4,262,687 | A | 4/1981 | Kobayashi |
| 4,263,928 | A | 4/1981 | Kobayashi et al. |
| 4,519,657 | A | 5/1985 | Jensen |

(Continued)

FOREIGN PATENT DOCUMENTS

| | | | |
|---|---|---|---|
| GB | 2359891 | 9/2001 | |
| KR | 20180055037 A * | 5/2018 | ............. F16K 31/02 |

OTHER PUBLICATIONS

Machine Translation KR 20180055037.*

(Continued)

*Primary Examiner* — Kevin F Murphy

(57) ABSTRACT

An apparatus for utility control is provided. The apparatus for utility control may include a protective enclosure and a front cover. A start actuator and a stop actuator are mounted on the front cover. Pushing the start actuator starts two timers for an ignitor circuit and a valve. The timers may be configurable and controlled by one or more dual in-line package (DIP) switches. Pushing the stop actuator stops one or both of the ignitor circuit and the flow of fluid through the valve. The apparatus for utility control includes a power supply to convert high voltage alternating current (AC) to low voltage direct current (DC). One or more electrical components, including the power supply, are mounted to the front cover to allow for enhanced serviceability of the apparatus for utility control.

6 Claims, 14 Drawing Sheets

(56) References Cited

U.S. PATENT DOCUMENTS

| | | | | |
|---|---|---|---|---|
| 4,841,287 | A | 6/1989 | Flig et al. | |
| 4,957,273 | A | 9/1990 | Sears | |
| 5,126,934 | A | 6/1992 | MacFadyen | |
| 5,267,587 | A | 12/1993 | Brown | |
| 5,274,527 | A | 12/1993 | Retzlaff | |
| 5,305,781 | A | 4/1994 | Raymond, Jr | |
| 5,331,619 | A | 7/1994 | Barnum et al. | |
| 5,440,477 | A | 8/1995 | Rohrberg et al. | |
| 5,572,438 | A | 11/1996 | Ehlers et al. | |
| 5,812,060 | A * | 9/1998 | DeSpain | A47J 37/1266 340/622 |
| 5,861,683 | A | 1/1999 | Engel et al. | |
| 6,237,618 | B1 | 5/2001 | Kushner | |
| 6,267,587 | B1 | 7/2001 | Bishop et al. | |
| 6,757,589 | B1 | 6/2004 | Parker et al. | |
| 6,775,593 | B1 | 8/2004 | Parker et al. | |
| 6,990,393 | B2 | 1/2006 | Parker | |
| 7,633,017 | B2 * | 12/2009 | Young | H01R 9/2491 239/69 |
| 8,543,225 | B2 | 9/2013 | Parker | |
| 9,546,742 | B2 | 1/2017 | Brown | |
| 9,683,911 | B2 | 6/2017 | Parker | |
| 10,162,321 | B1 | 12/2018 | Parker | |
| 10,168,680 | B1 | 1/2019 | Parker | |
| 10,509,380 | B1 | 12/2019 | Parker | |
| 10,982,789 | B2 * | 4/2021 | Heizenroeder | G01F 15/14 |
| 11,506,301 | B2 * | 11/2022 | Oshima | F16K 31/05 |
| 11,815,195 | B1 * | 11/2023 | Young | F16K 37/0008 |
| 2002/0011949 | A1 | 1/2002 | Rudow et al. | |
| 2005/0033479 | A1 | 2/2005 | Parker | |
| 2006/0020469 | A1 | 1/2006 | Rast | |
| 2007/0053123 | A1 | 3/2007 | Filippenko | |
| 2007/0220907 | A1 | 9/2007 | Ehlers | |
| 2008/0091309 | A1 | 4/2008 | Walker | |
| 2008/0115147 | A1 | 5/2008 | Ding | |
| 2010/0164296 | A1 | 7/2010 | Kurs et al. | |
| 2010/0179670 | A1 | 7/2010 | Forbes | |
| 2011/0004357 | A1 | 1/2011 | Mathiowetz | |
| 2011/0093123 | A1 | 4/2011 | Alexanian | |
| 2011/0178609 | A1 | 7/2011 | Parker | |
| 2014/0096850 | A1 | 4/2014 | Filkovski | |
| 2015/0057765 | A1 | 2/2015 | Parker | |
| 2016/0289929 | A1 | 10/2016 | Guy | |
| 2018/0252888 | A1 | 9/2018 | Carapella | |

OTHER PUBLICATIONS

Flamefast Product Data Sheet, Flamefast Gasguard 1 Automatic Gas Proving System, Jun. 2003, 2 pages.

Medem UK Products Brochure, Gas Pressure Proving System GPPS-plus, 9 pages, Jan. 11, 2002.

T.C.W. Services (Controls), LTD, Firewatch Brochure, Gas Supply Isolating and Pressure Drop Testing System, 34 pages, Jun. 8, 2001.

* cited by examiner

APPARATUS FOR UTILITY CONTROL

RELATED APPLICATION

This application may be related to U.S. patent application Ser. No. 16/990,211, filed Aug. 11, 2020, and titled Water and Gas Utility Control Systems and Retrofitting Kit (now issued as U.S. Pat. No. 11,815,195), the entire disclosure of which is incorporated by reference herein for all purposes.

BACKGROUND

Protective enclosures, such as gang boxes, are used in electrical installations, serving as protection for electrical components and facilitating the organization of electrical wiring. Utility control systems regulate the flow of various utility fluids (e.g., gas), among other capabilities.

It is with respect to this general technical environment that aspects of the present application are directed.

SUMMARY

In an aspect, the present application relates to a utility control apparatus. The utility control apparatus comprises a front cover configured to cover a protective enclosure; a start actuator, wherein the start actuator: comprises at least a first exterior portion accessible from an exterior of the front cover and a first interior portion extending away from an interior surface of the front cover; and is configured, when activated, to cause the utility control apparatus to signal a valve controlling flow of a fluid to permit the flow of the fluid; a stop actuator, wherein the stop actuator: comprises at least a second exterior portion accessible from the exterior of the front cover and a second interior portion extending away from the interior surface of the front cover; and is configured, when activated, to cause the utility control apparatus to signal the valve controlling flow of a fluid to stop the flow of the fluid; a circuit board attached to at least one of the start actuator and the stop actuator and electrically connected to the start actuator and the stop actuator; and a power supply, attached to the circuit board and extending away from the circuit board towards the front cover, wherein an end of the power supply distal from the circuit board overlaps in a depth direction with at least one of the first interior portion and the second interior portion.

In some examples, the stop actuator and the start actuator are attached to the front cover. In some examples, the utility control apparatus includes an attachment mechanism to releasably attach the front cover to the protective enclosure, and wherein when the start actuator, stop actuator, circuit board, and power supply may be removed from the protective enclosure as a unit by removing the front cover from the protective enclosure. In some examples, the start actuator comprises a start button, and the stop actuator comprises one of a mushroom button, a flush mount button, and a keyed reset button. In some examples, the utility control apparatus further comprises a locking collar coupled to the stop actuator and securing the stop actuator to the front cover, wherein the front cover is disposed between the locking collar and the first exterior portion; and a contact block coupled to the locking collar, the contact block electrically connecting the circuit board to the stop actuator. In some examples, the start actuator comprises a plurality of prongs configured to electrically couple the start actuator to the circuit board, and wherein the plurality of prongs extend through the circuit board.

In another aspect, the technology relates to a utility control apparatus, comprising: a front cover configured to be attached to a protective enclosure; at least one actuator coupled to the front cover, wherein the at least one actuator causes the utility control apparatus to provide at least one of a start signal or a stop signal; a circuit board coupled to the at least one actuator; and a power supply, coupled to the circuit board and extending away from the circuit board towards the front cover; wherein the circuit board, the power supply, and the at least one actuator are insertable as a unit into, and removable as a unit from, the protective enclosure by attachment and detachment, respectively, of the front cover from the protective enclosure.

In some examples, the at least one actuator comprises a start actuator and a stop actuator. In additional examples, the utility control apparatus further comprises: a first relay coupled to the circuit board; a second relay coupled to the circuit board; a plurality of dual in-line package (DIP) switches coupled to the circuit board; a locking collar coupled to the stop button; and a contact block coupled to the locking collar, wherein the first relay, the second relay, the plurality of DIP switches, the power supply, the locking collar, the contact block, the stop button, the start button, and the circuit board are insertable as the unit into, and removable as a unit from, the protective enclosure by attachment and detachment, respectively, of the front cover from the protective enclosure. In some examples, a reference plane that is substantially parallel to the circuit board and tangential to an end of the power supply that is distal from the circuit board intersects an interior portion of the at least one actuator. In some examples, the start actuator comprises at least a first exterior portion accessible from an exterior of the front cover and a first interior portion extending away from an interior surface of the front cover, and wherein the stop actuator comprises at least a second exterior portion accessible from the exterior of the front cover and a second interior portion extending away from the interior surface of the front cover. In some examples, the utility control apparatus comprises a locking collar coupled to the stop button and configured to attach the stop button to the front cover; and a contact block coupled to the locking collar, wherein the contact block is configured to electrically couple the stop button to the circuit board. In some examples, the start button comprises a plurality of prongs configured to couple to the circuit board, and wherein the plurality of prongs are configured to electrically couple the start button to the circuit board, wherein the circuit board further comprises a second set of start actuator connectors configured to receive a second plurality of prongs for a key-switch-type start actuator.

In another aspect, the technology relates to a utility control apparatus, comprising: a first relay configured to turn on or off a high voltage output to an ignitor circuit; a second relay configured to control a low voltage output to a valve controlling fluid flow; and a controller configured to: provide a first timing signal to the first relay responsive to a start actuator being activated; and provide a second timing signal to the second relay responsive to the start actuator being activated, wherein responsive to the first timing signal, the first relay is configured to turn on the high voltage output to the ignitor circuit for a first duration that is based at least in part on the first timing signal, and wherein responsive to the second timing signal, the second relay is configured to signal the valve controlling flow of a fluid to permit the flow of the fluid for a second duration that is based at least in part on the second timing signal.

In some examples, the first duration is different from the second duration. In some examples, the controller is configured to provide the first timing signal based at least in part on a first plurality of dual in-line package (DIP) switches and the second timing signal based at least in part on a second plurality of DIP switches. In some examples, the first plurality of DIP switches indicates a timer setting for the ignitor circuit and the second plurality of DIP switches indicates a second timer setting for the valve. In some examples, the ignitor circuit comprises an ignitor or a glow plug, and wherein the valve comprises a solenoid valve or an electronic ball valve. In some examples, the first relay, the second relay, and the controller are attached to a circuit board. In some examples, the circuit board is attached to a start actuator and a stop actuator and wherein both of the start actuator and the stop actuator are attached to a front cover of a protective enclosure, but the circuit board is not attached to the protective enclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

There are shown in the drawings examples that are presently preferred, it being understood, however, that the invention is not limited to the precise arrangements and configurations shown.

DETAILED DESCRIPTION

Figure 1:
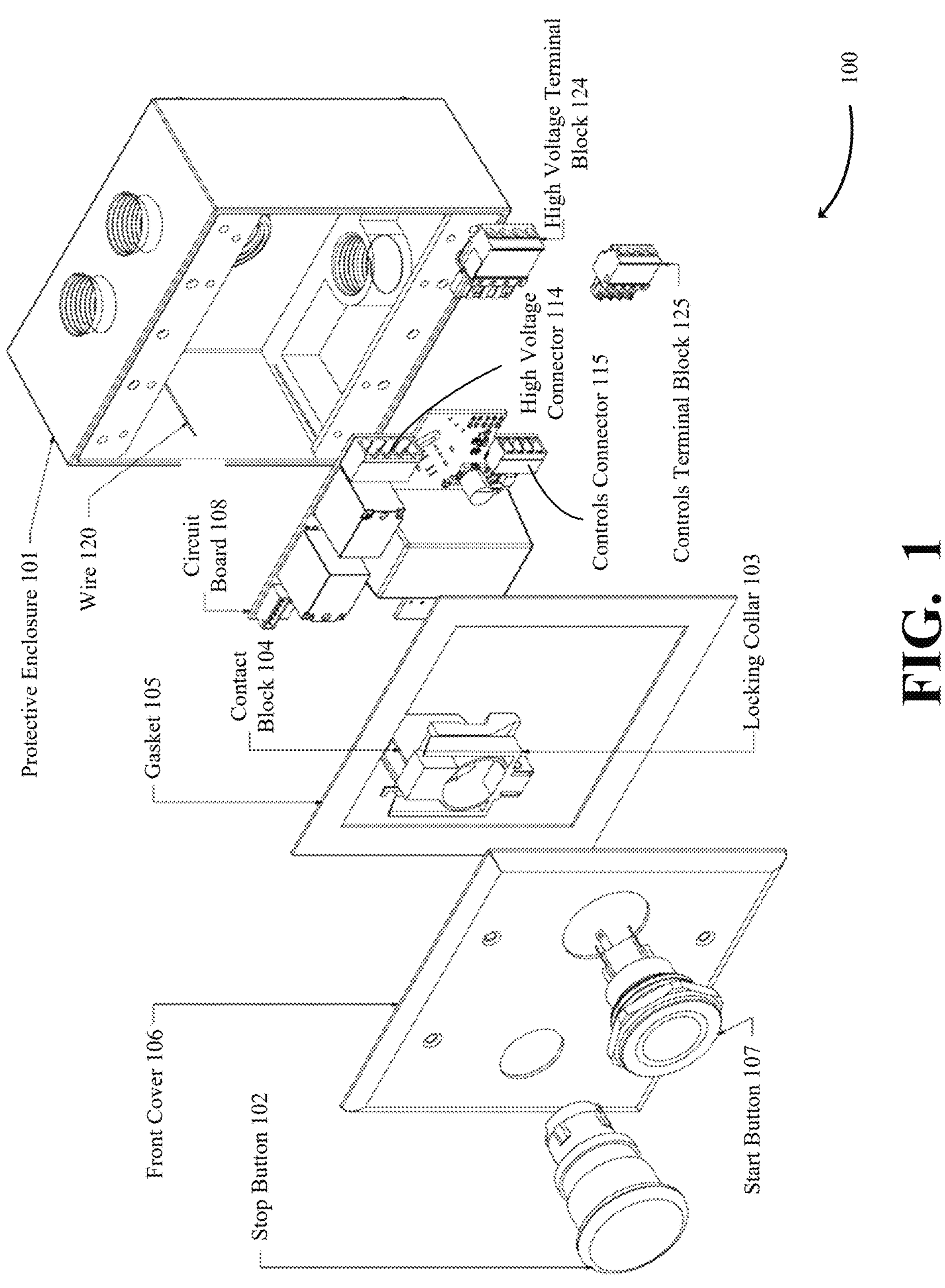
FIG. 1 is a partially exploded isometric view of an apparatus for utility control, including a protective enclosure and front cover.
Figure 2:
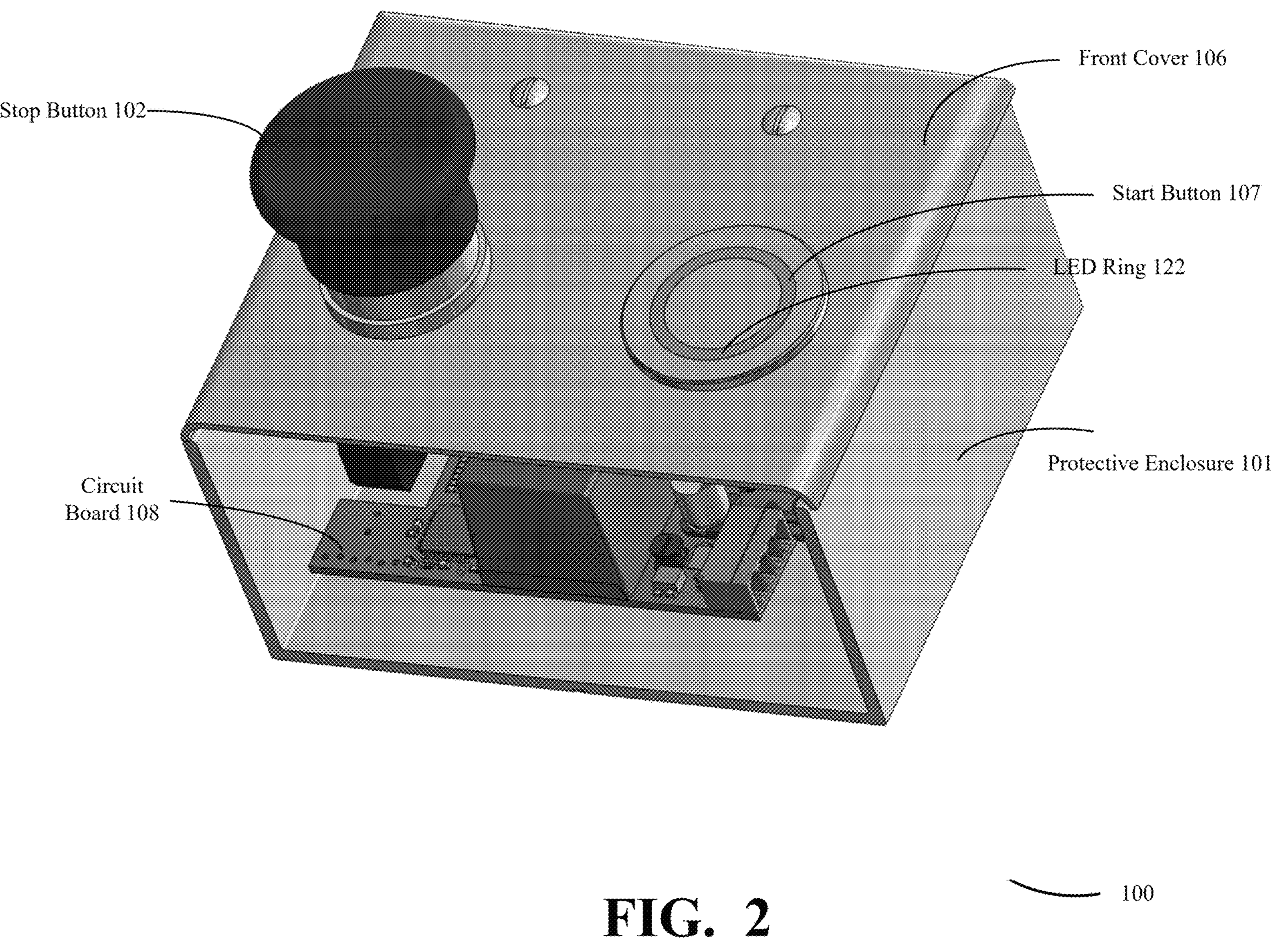
FIG. 2 is an isometric view of the assembled apparatus of FIG. 1, with a portion of the protective enclosure and front cover removed.
Figure 3:
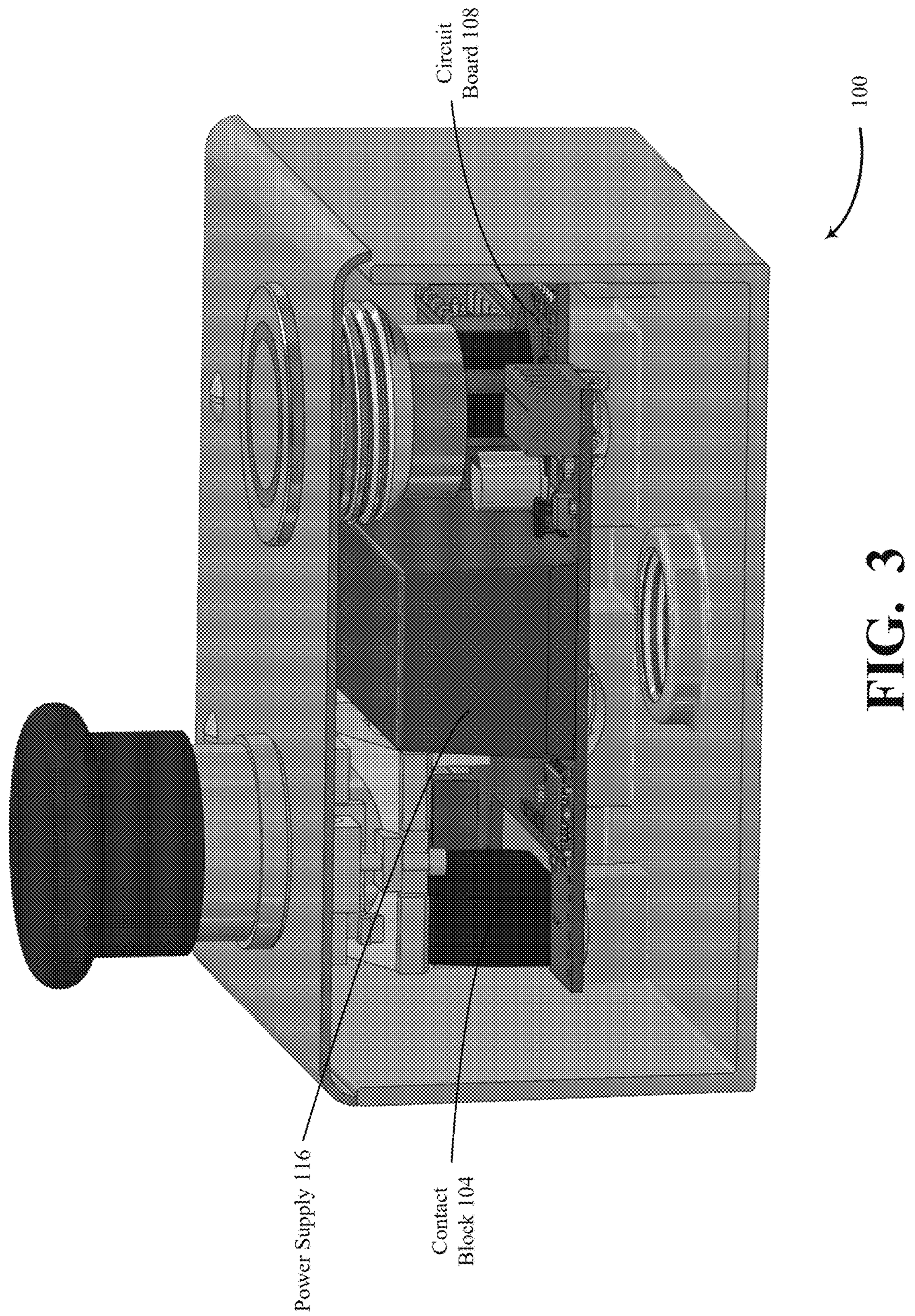
FIG. 3 is another isometric view of the assembled apparatus of FIG. 1, with a portion of the protective enclosure and front cover removed.
Figure 4:
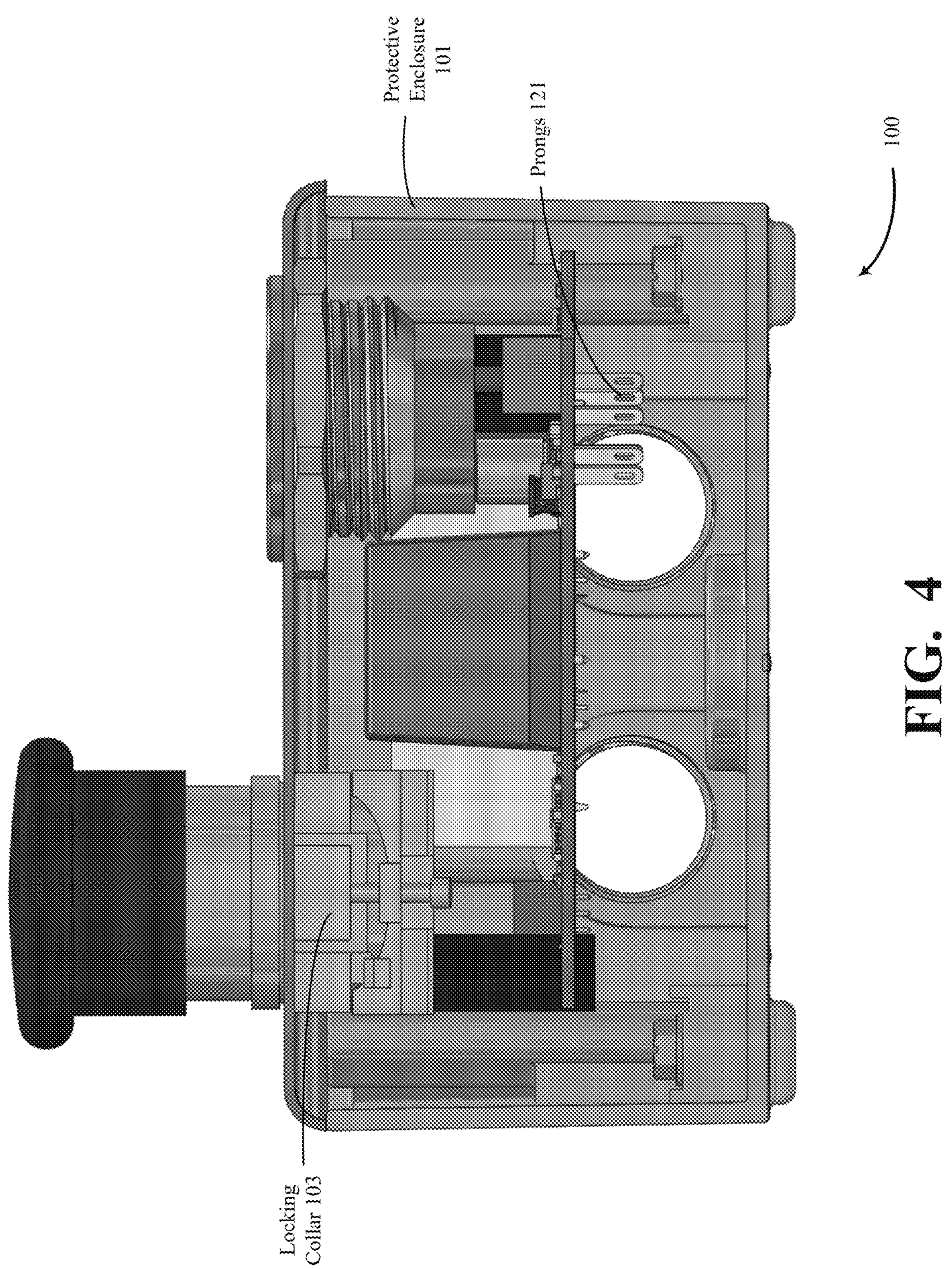
FIG. 4 is a bottom view of the assembled apparatus of FIG. 1, with a portion of the protective enclosure and front cover removed.
Figure 5:
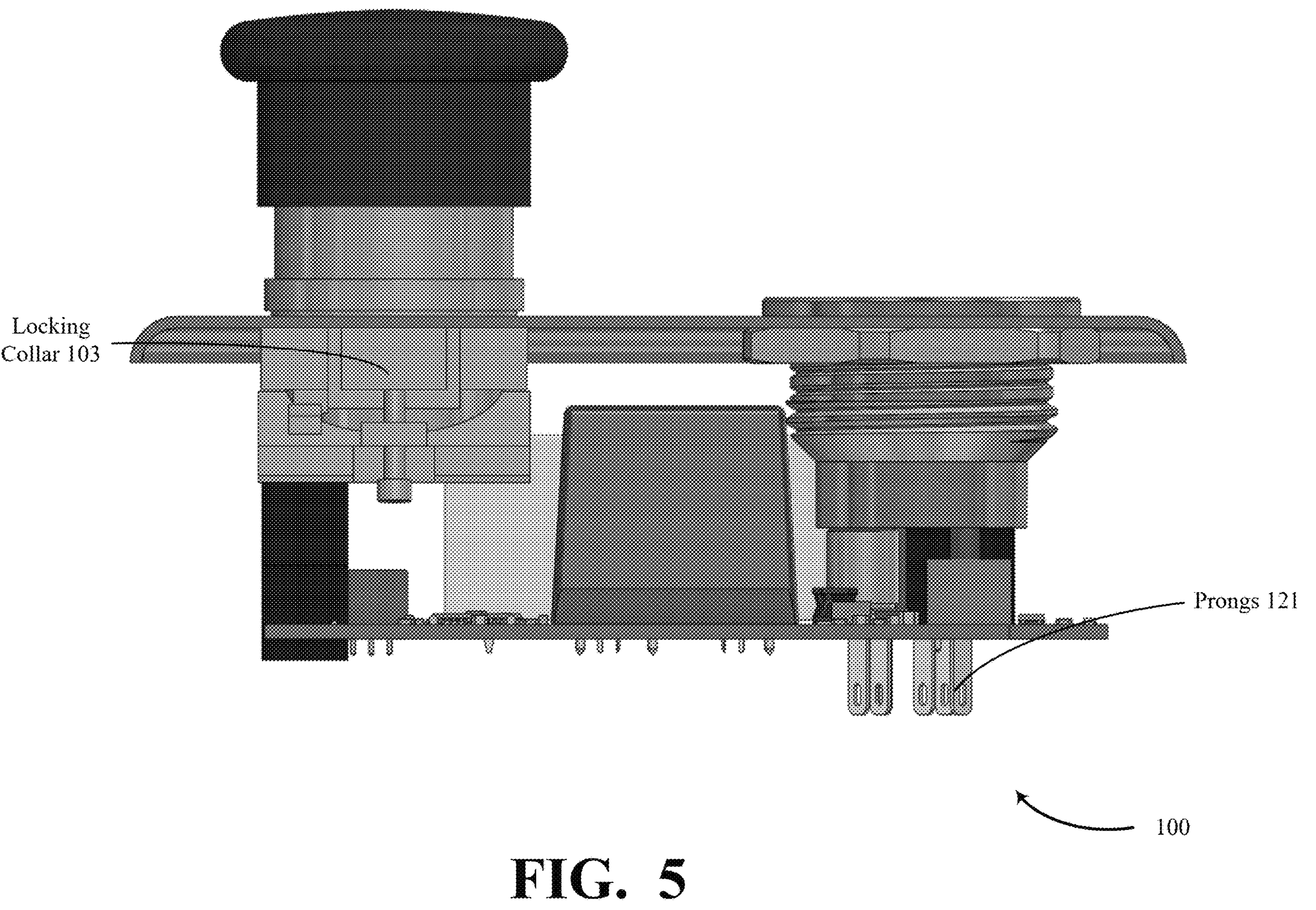
FIG. 5 is a bottom view of the assembled apparatus of FIG. 1, with the protective enclosure removed.
Figure 6:
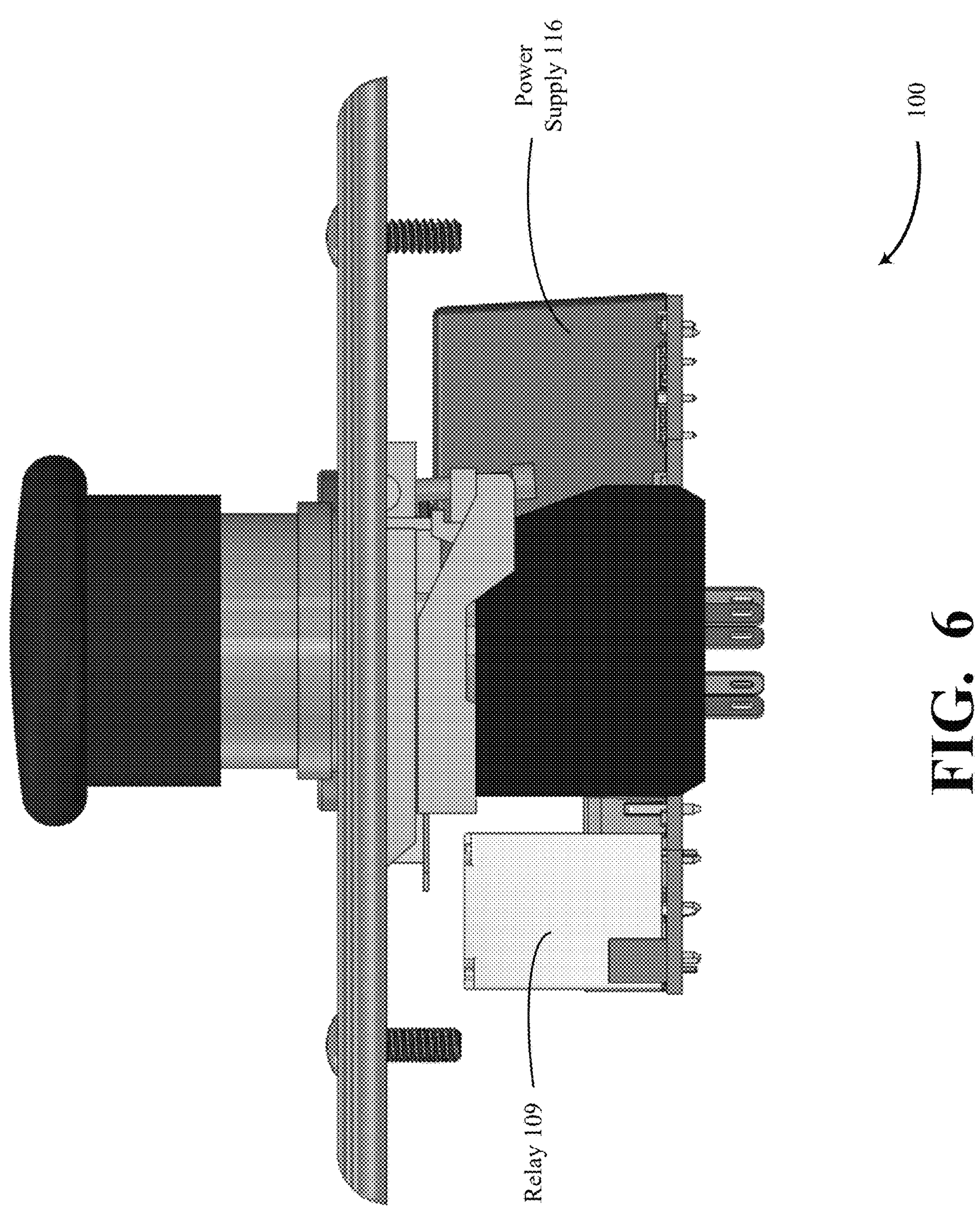
FIG. 6 is a left-side view of the assembled apparatus of FIG. 1, with the protective enclosure removed.
Figure 7:
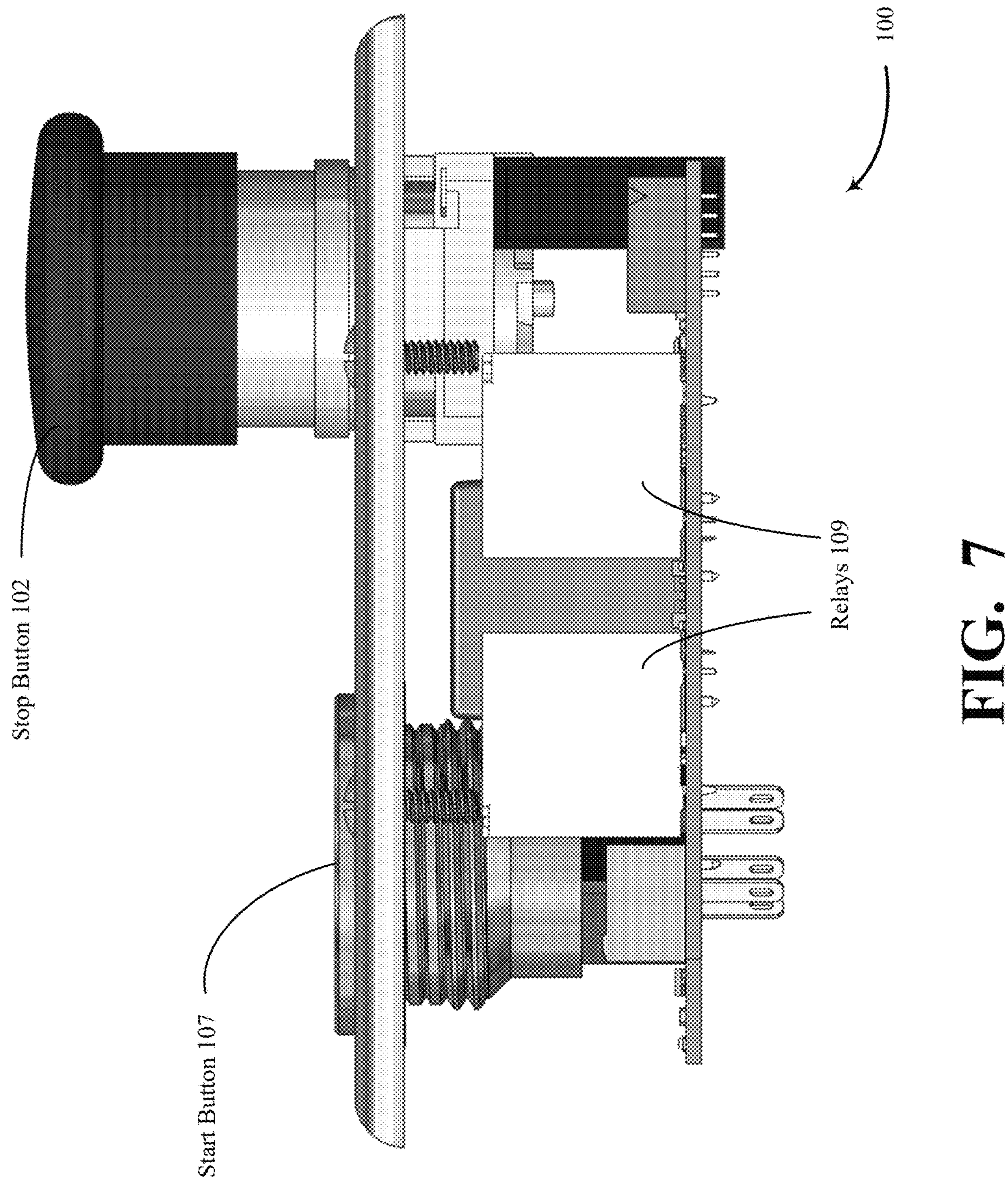
FIG. 7 is a top view of the assembled apparatus of FIG. 1, with the protective enclosure removed.
Figure 8:
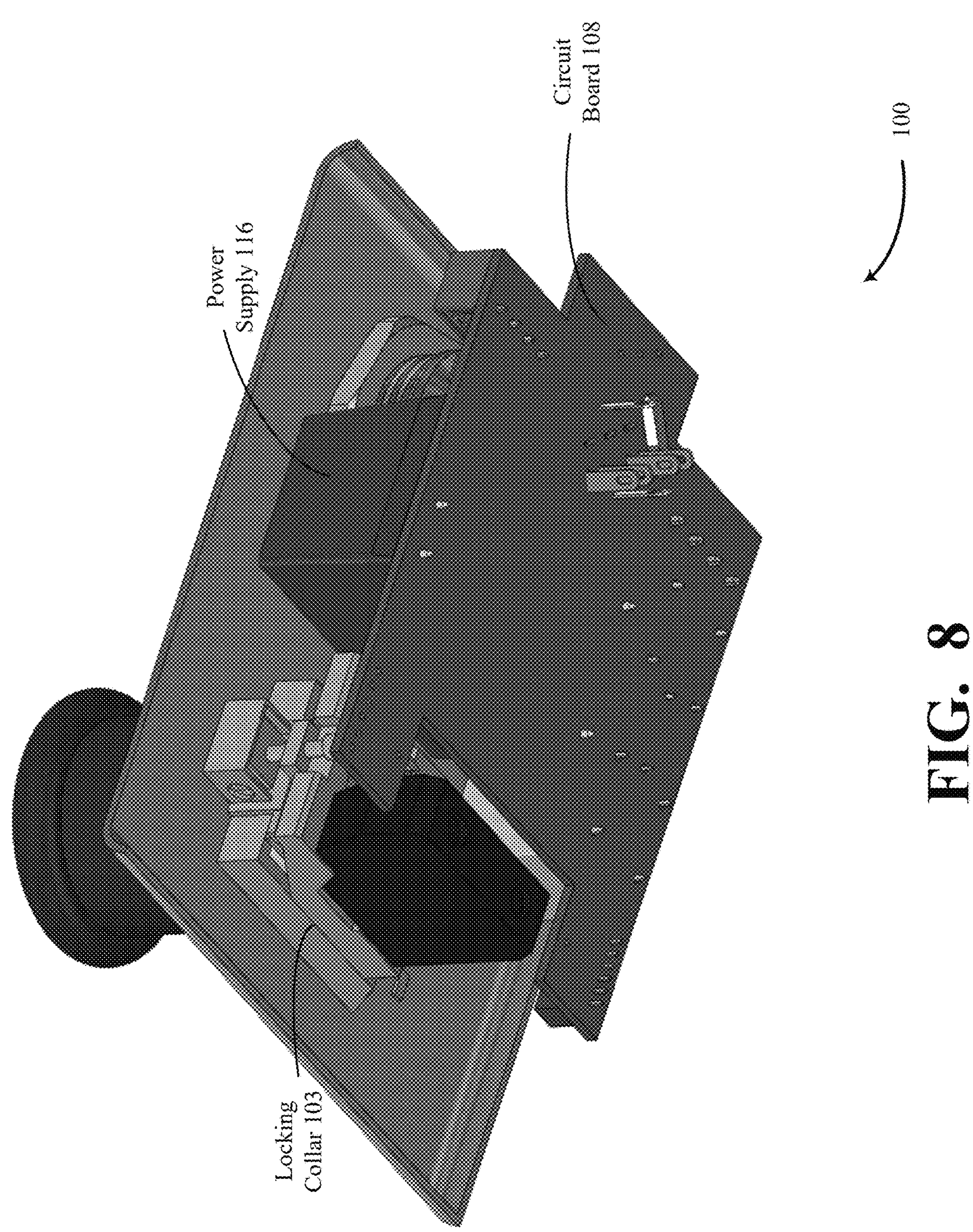
FIG. 8 is an isometric view of the assembled apparatus of FIG. 1, with the protective enclosure removed.
Figure 9:
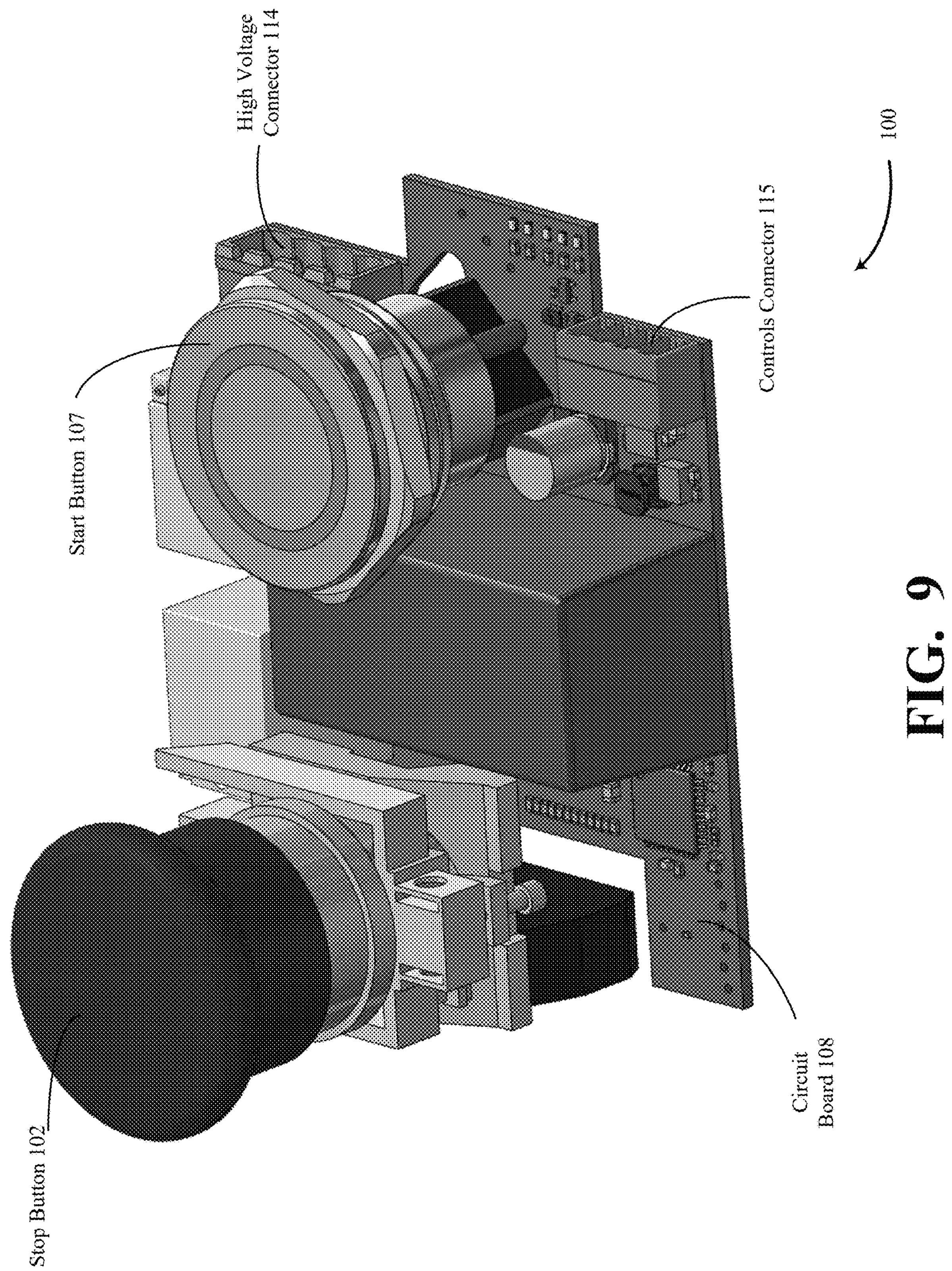
FIG. 9 is an isometric view of the assembled apparatus of FIG. 1, with the protective enclosure and front cover removed.
Figure 10:
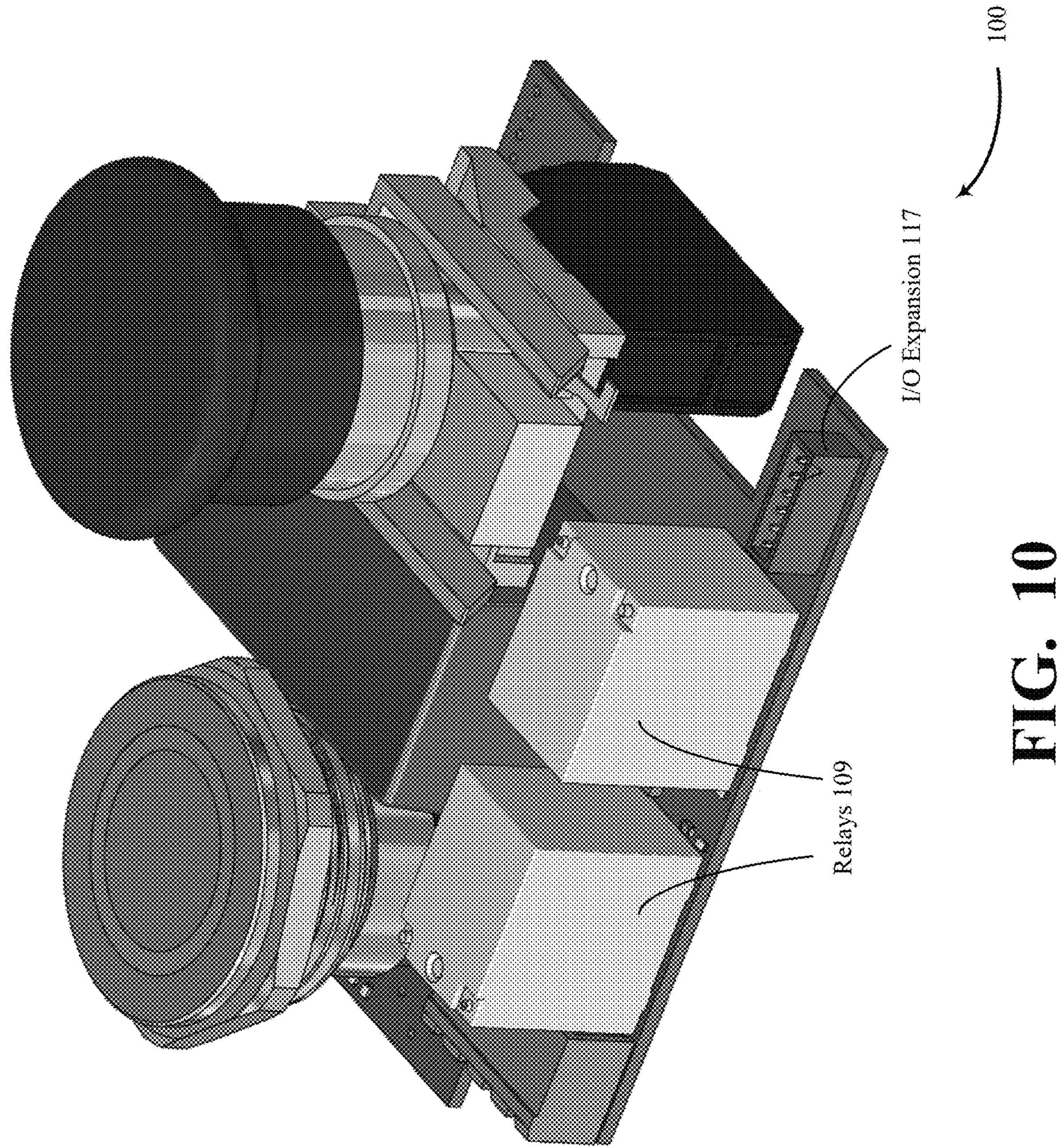
FIG. 10 is another isometric view of the assembled apparatus of FIG. 1, with the protective enclosure and front cover removed.

Referring concurrently to FIGS. 1-14, utility control apparatus 100 includes, e.g., protective enclosure 101, stop button 102, locking collar 103, contact block 104, gasket 105, front cover 106, start button 107, circuit board 108, relays 109, high voltage dual in-line package (DIP) switches 110, low voltage dual in-line package (DIP) switches 111, low voltage output 112, high voltage output 113, high voltage connector 114, controls connector 115, power supply 116, microcontroller 118, and/or start actuator connections 119. In examples, a reference to "low voltage" may refer to 24 V or lower or to 12 V or lower, and "high voltage" may refer to 120 V or higher. In some examples, "low voltage" may refer to less than 60 V, and "high voltage" may refer to more than 60 V. In other examples, "high voltage" may refer to any voltage that is at least double the low voltage. It should be noted that although DIP switches are depicted and discussed, substantially any type of programmable switch (e.g., a software-controlled switch) may be used as an alternative. In some examples, "attached" and "coupled" refer to physical attachment and "electrically connected" and "electrically coupled" refer to electrical connections between electrical components.

In examples, the utility control apparatus 100 may be used to control operation of a utility. In the nonexclusive example environment of FIG. 14, the utility comprises a gas supply 180 that is connected through one or more valve 170 to a gas appliance 150 (e.g., through piping); however, it will be understood by those of skill in the art that utility control apparatus 100 can be used to control other utilities (such as water) in certain applications. In this example, the gas appliance 150 may comprise a grill, a fireplace, a stove, a gas burner, etc. that utilizes gas to operate. In examples, it may be desired to control the gas appliance 150, including, e.g., turning the gas appliance 150 on by allowing gas to flow through valve 170 and igniting the flowing gas by powering ignitor circuit 160. Further, it may be desired to control the gas appliance 150 and related components by (a) automatically turning off power to ignitor circuit 160 after a certain time; (b) automatically closing the valve 170 after a certain time; and (c) allowing both power to the ignitor circuit 160 and the flow of gas through valve 170 to be turned off via an emergency stop mechanism. Utility control 100 may receive a high-voltage input from a power source 140 (e.g., a building power circuit or public utility connection) and may output both a low-voltage output to control operation of valve 170 and a high-voltage output to ignitor circuit 160. Although only one ignitor circuit 160, valve 170, and gas appliance 150 are depicted as being controlled by a single utility control apparatus 100, those of skill in the art will recognize that multiple such devices may be controlled via a single, or a plurality of distributed, utility control apparatus(es).

Protective enclosure 101 at least partially encases one or more electronic components and other components of utility control apparatus 100. In some examples, protective enclosure 101 is a gang box (e.g., a double gang box). In some examples, protective enclosure 101 may conform to particular standards, such as the dimensionality standards of a double gang box (also referred to as a 2-gang box). In some examples, the protective enclosure is not more than 4.6 inches wide, not more than 4.6 inches high, and not more than 2.5 inches deep. For example, protective enclosure 101 may have a substantially square cross-sectional shape with dimensions of 4.56 inches high by 4.56 inches wide, with a depth of 2.5 inches, which is the standard size of a weatherproof double gang box. In examples, a protective enclosure 101 that comprises an interior, flush-mounted double gang box may be slightly smaller. In some examples, protective enclosure 101 may include one or more holes for wiring into and out of protective enclosure 101 (e.g., one or more holes in a back surface of protective enclosure 101, which may be opposite of front cover 106 and/or in one or more side walls of protective enclosure 101). Protective enclosure 101 may be made out of substantially any material or combination of materials such as ceramics, metals, plastics, or the like. In some nonexclusive examples, the protective enclosure 101 may be mounted to a structure. For example, the protective enclosure may be mounted indoors and may comprise a flush-mounted double gang box, wherein the protective enclosure is secured to a wall stud and the side walls extend to an edge of an abutting finished wall material, such as drywall. In such examples, the protective enclosure 101 may not be visible once the front cover 106 is attached to the protective enclosure, and the junction of the protective enclosure to the finished wall material may be painted, caulked, or otherwise treated to improve the aesthetic incorporation of the protective enclosure into the wall. In other examples, the protective enclosure 101 may be mounted outdoors in a weatherproof double gang box, such as to a pole, an exterior wall, a fireplace structure, a grill, etc. In examples, the protective enclosure 101 and any surrounding materials may again be finished or treated to improve the appearance and aesthetic integration of the protective enclosure 101 with surrounding materials. Some examples of protective enclosure 101 may be waterproof or otherwise weatherproof, while others (e.g., interior gang boxes) may be designed to simply provide a structured space in which components may be housed and connected. Other mounting options are possible and contemplated.

In examples, the utility control apparatus 100 includes a stop actuator. In the particular example illustrated, the stop actuator is a stop button 102, but other actuators are possible and contemplated, such as a flip switch, a turn switch, a rotating dial, etc. In the depicted example, stop button 102 is a button configured to provide a stop mechanism for a utility (such as gas supply 180). For example, if utility control apparatus 100 controls the flow of gas, pressing stop button 102 may stop the flow of gas by causing valve 170 to close and causing power to be cutoff to ignitor circuit 160.

Although a mushroom-style button is depicted, stop button 102 may be a mushroom stop button, a flush mount button, a keyed reset button, or any other button or switch type. A mushroom stop button is a type of button that has a large, round head that resembles a mushroom. It is designed to be easily visible and accessible in case of an emergency situation that requires the immediate shutdown of a utility. In some examples, when pressed, the stop button 102 opens a normally closed contact that interrupts the power output from utility control apparatus 100. For example, pressing the stop button 102 may cause the high-voltage output to ignitor circuit 160 and low-voltage output to valve 170 to be ceased. In examples, valve 170 may be configured to be normally closed (not allowing gas from gas supply 180 to flow to gas appliance 150), unless the low-voltage output from utility control apparatus 100 is received. In examples, the valve 170 may comprise a solenoid valve or an electric ball valve that is configured to open (and remain open) only while such signal is received. In other examples, valve 170 may be configured to be normally open and require a low-voltage signal output from the utility control apparatus to close. Other signaling is possible and contemplated to cause the valve 170 to open or close, as required. Depending on the configuration of valve 170, components of the circuit board 108 may be configured appropriately to provide the necessary low voltage signaling (including signal cutoff and/or active signaling) to cause the valve 170 to close and ignitor circuit to turn OFF in response to receiving a press of stop button 102.

In some examples, once pressed, the stop button 102 may lock into place, and resetting the stop button 102 may require a pull, a twist, or a key release action. In other examples, the stop button may return to its unpressed position automatically when not pressed. In additional examples, stop button 102 may comprise a flush mount button. A flush mount button is a type of start button switch that is mounted with only the face of the button exposed to an exterior of the front cover 106. This makes the button flush with the surface of the front cover 106. In other examples, a keyed reset button may be used. A keyed reset button is a type of button that requires a key to be inserted and turned in order to reset the button to its normal state after being activated. This provides an additional level of security and control over the button operation. In examples, stop button 102 includes an exterior portion that is exposed to, or extends from, an exterior surface of the front cover 106, and an interior portion that extends away from the front cover towards the circuit board 108. In the depicted example, the stop button 102 extends through an opening in front cover 106 and securely engages with locking collar 103.

Locking collar 103 secures the stop button 102 to the front cover 106 by receiving the interior portion of the stop button through an opening of the front cover 106 and securing the interior portion to the locking collar. In some examples, stop button 102 may quarter-turn, half-turn, three-quarter-turn, or any other amount, into locking collar 103 to secure the interior portion of the stop button 102 to locking collar 103. In some examples, a metal latch may secure or couple stop button 102 with locking collar 103. The interior portion of the stop button 102 may be configured such that it is just deep enough to be secured into the locking collar 103 while causing the exterior portion of the stop button 102 to squeeze the front cover 106 between the locking collar and a ridge or flange of the exterior portion that is too large to fit through the opening of the front cover 106. Locking collar 103 may also be coupled with contact block 104, e.g., by a snap-in or latching mechanism and/or by screws or other fasteners. In some examples, locking collar 103, front cover 106, and/or stop button 102 may also include one or more fasteners (e.g., screws) and corresponding receptacles (e.g., threaded openings) configured to attach locking collar 103 and/or stop button 102 to front cover 106. This may accommodate different thicknesses of front plate 106. In some examples, a separate locking collar 103 may be unnecessary. For example, front cover 106 may have an integrated locking receptacle, such that when the interior portion of the stop button 102 is inserted through the opening in the front cover 106, it can be twisted and locked directly to the front cover 106. Other possibilities for connecting a stop actuator (such as stop button 102) to the front cover 106 are possible and contemplated.

Contact block 104 electrically connects stop button 102 to circuit board 108. Contact block 104 may be attached to locking collar 103. Contact block 104 may be electrically connected with circuit board 108 via a wire 120. In some examples, the wire electrically couples contact block 104 to a panic/emergency input at controls connector 115 (discussed below). In some other examples, the wire 120 electrically couples contact block 104 to a different input of circuit board 108.

Front cover 106 may comprise a covering to protect and/or conceal electrical components within protective enclosure 101. Front cover 106 may be made of substantially the same material as that of protective enclosure 101, or of a different material. Front cover 106 may have a substantially rectangular or square shape configured to at least partially cover an open front end of protective enclosure 101. Front cover 106 may comprise at least two larger openings. One opening may be configured to receive stop button 102, and another opening may be configured to receive start button 107. Each opening may be sized differently or the same as one another. Front cover 106 may include one or more smaller openings to receive screws (or other fasteners) for mounting front cover 106 to protective enclosure 101. In some examples, the front cover 106 may be connected via one or more hinge to the protective enclosure 101 such that the front cover 106 may be swung open while remaining hingedly attached to the protective enclosure 101. In addition, a gasket 105 may be disposed between front cover 106 and protective enclosure 101 and attached to one or both of the front cover 106 and the protective enclosure 101.

In examples, the utility control apparatus 100 also includes a start actuator. In the particular example illustrated, the start actuator is a start button 107, but other actuators are possible and contemplated, such as a flip switch, a turn switch, a rotating dial, etc. In the depicted example, start button 107 is a button configured to provide at least an ON signal for the controlled utility. A visual indicator, such as an LED ring 122 (see FIG. 2) visible on the exterior portion of the start button 107, may indicate a current state of the utility. For example, the visual indicator may illuminate red when the utility is in an off state (e.g., valve 170 is closed) or green when the utility is in an on state (e.g., valve 170 is open). In some examples, a third state may also be identified by the visual indicator (e.g., by a third color or by a blinking red or blinking green) to indicate when a valve is in the process of opening or closing. In examples where the utility control apparatus 100 controls the flow of gas, pressing start button 107 while the utility is in an off state may cause the utility control apparatus 100 to signal the valve 170 to open and may cause a high-voltage signal to be transmitted from the utility control apparatus 100 to the ignitor circuit 160 to cause ignition of the flowing gas. An O-ring may be configured to attach to start button 107 such that the O-ring sits between start button 107 and front cover 106, weatherproofing that portion of utility control apparatus 100.

Start button 107 (or other start actuator) may include one or more electrical prongs 121 configured to electrically connect the start button 107 to circuit board 108. In examples, for installation of start button 107: (a) the O-ring may be placed on front cover 106; (b) start button 107 may be pressed through its respective hole in front cover 106; (c) a nut may be loosely attached to a threaded interior portion of start button 107; (d) start button 107 may be rotated to line the electrical prongs 121 of start button 107 up with the start button connections in circuit board 108; (e) the nut may be tightened against an interior surface of the front cover 106 to pull an exterior flange that is broader than the hole in the front cover 106 against the exterior surface of the front cover 106 and firmly connect the start button 107 to the front cover 106; and (f) in some examples, the connections between the prongs 121 of start button 107 and the respective start actuator connections 119 in circuit board 108 may be soldered. In examples, start button 107 includes an exterior portion that is exposed to, or extends from, an exterior surface of the front cover 106, and an interior portion that extends away from the front cover towards the circuit board 108. In some examples, a nut to secure the start button 107 to the front cover 106 may be unnecessary. For example, front cover 106 may have an integrated locking receptacle, such that when the interior portion of the start button 107 is inserted through the opening in the front cover 106, it can be twisted and locked directly to the front cover 106, among other examples. Further, in the depicted example, the start button 107 extends through an opening in front cover 106 and attaches to circuit board 108 (e.g., by soldering of prongs 121 to start actuator connections 119). In examples, the prongs 121 (or other connection mechanism of the start button 107) may be alternatively attached to the circuit board 108 using electrically conductive snap-fit or friction-fit start actuator connections 119, or otherwise. Other examples of attaching the start button 107 to the front cover 106 and the circuit board 108 are possible and contemplated.

Activating start button 107 when the utility is in an off state may initiate a gas flow timer and an ignitor timer, as will be discussed herein. If the start button 107 is pressed while the utility is already in an on state (e.g., valve 170 is already open), the button push may be ignored. In other examples, pushing button 107 while the utility is already in an on state may cause a timer (e.g., a gas flow timer) to reset to an original value).

In some other examples, activating the start actuator starts one or more timers that are not able to be reset during the timer duration. For example, if the start actuator is activated and held in an activated state (e.g., pressed and held), either or both of the timer signals for valve 170 and ignitor circuit 160 may be provided, but the timer signals may not be provided again during the timer durations. This prevents ignitor circuit 160 and valve 170 from being overused, and additionally provides a safety feature that may prevent fires, leakage, or other issues.

In some examples, the start actuator includes one or more light emitting diode (LED) ring 122, or any other lights, or any other visual indicator component. In the Figures, LED ring 122 is depicted, but substantially any other visual indicator component may be contemplated. LED ring 122 may indicate a state of the controlled utility (e.g., ON, OFF, or in the process of turning ON or OFF). For example, the start actuator may include an LED ring 122 that glows green (or any other color) when the utility is ON. For example, the LED ring may glow green for a few seconds after the start actuator is activated, or the LED ring may glow green for as long as one or both of the timers for ignitor circuit 160 and valve 170 are active. In some examples, the LED ring may glow red (or any other color) when the utility is OFF, or after one or both of the timers for ignitor circuit 160 and valve 170 have expired. In other examples, the utility control apparatus 100 may receive feedback from valve 170 to indicate when the valve is in an open, closed, opening, or closing state, and the visual indication provided by the LED ring may be based on that feedback. Examples of a utility controller receiving state information from a valve can be found in U.S. Pat. No. 11,815,195, the entire disclosure of which is incorporated by reference herein for all purposes.

As discussed, a different start actuator may be used. For example, a key switch interchange may be used as an alternative to start button 107. A key switch interchange is a type of switch that uses a key to activate a circuit (e.g., turn on the utility). It is an alternative to start button 107, which requires a finger or hand to press the button. A key switch interchange can provide more security and control over the switch operation, as only authorized users with the correct key can access the switch. A key switch interchange can also have different modes, such as momentary, maintained, or toggle, depending on how the key is turned or removed. In such cases, circuit board 108 may include one or more key switch connections in addition or alternatively to the one or more start button connections.

In examples, circuit board 108 is a flat piece of material that holds and connects electronic components using conductive pathways. Circuit board 108 provides a platform for the components to be mounted and interconnected, allowing electrical signals to flow between them and enabling the functioning of electronic devices. In examples, circuit board 108 includes several layers of different materials, such as a base material, a copper layer, a solder mask, and a silkscreen.

In examples, the base material, or substrate, of circuit board 108 may include fiberglass or plastic. The copper layer may include a thin sheet of copper foil that is laminated onto the substrate. This layer forms the traces, or lines, that connect the components on the board. The copper layer can be single-sided, double-sided, or multi-layered, depending on the complexity of the circuit. The solder mask is a layer of protection for the copper layer that prevents oxidation and short circuits. It may cover circuit board 108 except for the pads and holes where the components are soldered. The silkscreen is a layer of text and symbols that serves as a reference guide for the components and their functions. It may be printed on top of the solder mask. Circuit board 108 may also have various other customary features and components, including pads, holes, vias, and/or jumpers. In some examples, circuit board 108 includes additional an I/O expansion 117 for additional inputs and outputs.

Circuit board 108 may have a substantially square or rectangular shape. Circuit board 108 may be designed to fit within protective enclosure 101 (e.g., within a double gang box with standard dimensions). The electrical components described below may be placed on, or connected to, circuit board 108 in such a configuration as to allow for ease of serviceability or replacement of the electrical components of utility control apparatus 100. In examples, the majority or all electrical components may be attached or coupled to front cover 106 (e.g., no electrical components may be attached or coupled to any wall of protective enclosure 101). For example, although certain wires that are also connected to the circuit board 108 (such as a high-voltage input wire) may contact the protective enclosure 101 as they are threaded through hole(s) in the protective enclosure 101, the circuit board 108 itself, nor any of the components attached thereto, are attached to the protective enclosure 101. As such, when the front cover 106 is detached from the protective enclosure 101, all of the elements attached thereto (e.g., stop button 102, start button 107, contact block 104, locking collar 103, circuit board 108, power supply 116, etc.) may be lifted out of the protective enclosure 101 as a unit. This permits the entire set of electrical components of utility control apparatus 100 to be replaced without disturbing or replacing the existing protective enclosure 101. The entire unit may be removed, and the input and output wires may be disconnected via their respective connectors and terminal blocks. A new or repaired unit can then be installed and attached to the existing protective enclosure 101. Among other things, this simplifies maintenance and does not require surrounding drywall or finishing near the protective enclosure 101 to be disturbed. The configuration of such electrical components, including those that interface with circuit board 108, is discussed below.

Circuit board 108 may include one or more electrical components. For example, circuit board 108 may include controls connector 115, high voltage connector 114, one or more relays 109, one or more high voltage DIP switches 110, one or more low voltage DIP switches 111, one or more microcontrollers 118, one or more start actuator connections 119, power supply 116, or a combination of these. In addition, circuit board 108 may include a variety of other electrical components (resistors, capacitors, filters, relays, timer integrated circuits, etc.) arranged to produce necessary signals to cause desired opening or closing of a valve and/or providing high voltage current to an ignitor circuit 160. In examples, one or more of the systems or techniques described in U.S. Pat. No. 11,815,195 may be used to convert a high voltage input into low voltage control signal output to a valve, such as valve 170. For example, a variety of low-voltage signals (e.g., positive or negative pulses or ground pulses) may be produced to cause a latching solenoid valve to latch into a desired open or closed position and/or control the rotation (opening or closing) of a ball valve.

Relays 109 may comprise electromagnetic switches that open and close circuits electromechanically and/or electronically. In examples, relays 109 may be electromechanical relays, solid state relays, or reed relays. One of relays 109 may control low voltage output 112 (e.g., for valve 170), and another one of relays 109 may control high voltage output 113 (e.g., for the ignitor circuit 160). One or more relays 109 may control the low voltage output 112 and/or high voltage output 113 based on a timer signal from microcontroller 118. In examples, low voltage output is direct current (DC). In addition, as discussed, multiple valves 170 and ignitor circuits 160 may be controlled by a single utility control apparatus 100. As such, the number of relays 109 used to control the low voltage output 112 and/or high voltage output 113 for the plurality of valves 170 and circuits 160 may be correspondingly increased, as necessary.

High voltage DIP switches 110 (or other configurable switches) may control the timer for an ignitor circuit 160, which may comprise an electrical ignitor or glow plug (e.g., ignitor circuit 160). DIP switches are dual in-line package switches, meaning that they consist of a series of configurable switches in a single unit. They are electromechanical devices that allow users to manually change the configuration or mode of an electronic circuit by toggling the switch positions. In examples, microcontroller 118 reads signals (e.g., binary signals) from high voltage DIP switches 110 and interprets them as timer settings (e.g., a duration). In some examples, microcontroller 118 includes a programmable instruction set that interprets the DIP switch settings as particular time periods. Microcontroller 118 generates a timer signal based on the timer settings from the high voltage DIP switches 110 and provides the timer signal to the respective relay 109 and/or other components of circuit board 108 to turn OFF or ON high voltage output 113.

In examples, high voltage DIP switches 110 may control the timer for the ignitor circuit 160 by using binary coding to represent different time intervals. For example, by turning on or off the switches, the user can create different combinations of binary numbers, which can then be interpreted (e.g., by microcontroller 118) as the number of seconds, minutes, or hours that the timer will run, depending on the design of the ignitor circuit 160 and or the needs of the gas appliance 150. In some additional examples, high voltage DIP switches 110 may also control other functions of the utility control apparatus 100, such as settings to dictate the visual indicator colors, flashing, and/or duration/timing, test configurations, etc.

Low voltage DIP switches 111 may work similarly as high voltage DIP switches 110, and thus repeated discussion is omitted for brevity. Low voltage DIP switches 111 control the timer for a valve, such as valve 170, which may comprise one or more solenoid valve or electronic ball valve. In examples, microcontroller 118 reads signals (e.g., binary signals) from low voltage DIP switches 111 and interprets them as timer settings. Microcontroller 118 may generate a timer signal based on the timer settings from the low voltage DIP switches 111 and provide the timer signal to a relay 109 and/or other elements of circuit board 108 to generate an appropriate signal on low voltage output 112 to control the valve. As discussed, in examples, one or more of the systems or techniques described in U.S. Pat. No. 11,815,195 may be used to convert a high voltage input into low voltage control signal output to a valve, such as valve 170. For example, a variety of low-voltage signals (e.g., positive or negative pulses or ground pulses) may be produced to cause a latching solenoid valve to latch into a desired open or closed position and/or control the rotation (opening or closing) of a ball valve.

For example, when start button 107 is pressed, depending on the then-current state of valve 170, a signal on the low voltage output 112 may be provided to open valve 170 for a time period controlled by the low voltage DIP switches 111. In some examples, depending on the type and configuration of valve 170, the low voltage output signal may comprise a continuous signal (e.g., continuous set of pulses) during the time period to keep valve 170 in the open state. In such examples, when the low voltage output signal is no longer received at valve 170, valve 170 may automatically close. In other examples, a shorter signal or series of pulses may be sent to valve 170 to cause the valve 170 to open, and then a second signal (e.g., set of pulses) may be sent at the end of the time period to cause valve 170 to close (unless valve 170 has already closed in response to a press of the stop button 102).

A high voltage output signal, when active, provides high voltage power to the ignitor circuit 160. High voltage output may be provided via high voltage output port 113 based on the timer controlled by high voltage DIP switches 110. For example, when start button 107 is pressed, a high voltage output may be provided for a time period controlled by the settings of the high voltage DIP switches 110. The high voltage output signal may be pulsed and/or continuous, as required by the design of the ignitor circuit 160. The timer settings for a low voltage output signal and high voltage output signal may be a different amount of time. For example, timer duration set by low voltage DIP switches 111 may be longer than the timer duration set by high voltage DIP switches 110, as the time required for ignition of a gas appliance 150 is generally considerably shorter than the time the gas appliance 150 will operate.

High voltage connector 114 is attached to circuit board 108 and includes ports for one or more inputs and outputs, including ground, neutral, high voltage input 123, and high voltage output 113. Electrical pathways are established on the circuit board 108 to connect the respective input and output ports of high voltage connector 114 to appropriate components of the circuit board 108. For example, the circuit board 108 may include pathways or other connections between the power supply 118 and the ground, neutral, high voltage input 123 and high voltage output 113 ports of connector 114. Connections between other ports of high voltage connector 114 and other components of circuit board 108 are also made, as necessary.

High voltage terminal block 124 may comprise a plurality of wire connectors formed into a contiguous block. High voltage terminal block 124 may be configured to snap into high voltage connector 114. Respective wires may be received by the wire connectors of terminal block 124, which provides electrical pathways to the corresponding ports of high voltage connector 114 on the circuit board (e.g., corresponding to the ground, neutral, high voltage input 123, and high voltage output 113 ports in FIG. 11).

For example, the port for high voltage input 123 of connector 114 may connect circuit board 108 through a corresponding port on high voltage terminal block 124 to a wire connected to power source 140 (e.g., an alternating current (AC) power source, such as a building or public utility power source). High voltage power source 140 may comprise a wall outlet, building power, or any other source configured to provide high voltage AC power. The high voltage output port 113 may connect through a corresponding port on terminal block 124 to an output wire connected to an ignitor circuit, such as ignitor circuit 160. The inputs and outputs of high voltage connector 114 and terminal block 124 may be in different locations or in a different order than those presented in the Figures.

Controls connector 115 is attached to the circuit board 108 and includes one or more input and output terminals. For example, controls connector 115 includes ports for a key bypass input, a panic/emergency input, a ground, and/or a low voltage output. Controls terminal block 125 may couple to controls connector 115 (e.g., via a snap fit), and respective input and output wires may be coupled to the one or more wire connectors of controls terminal block 125 (e.g., corresponding to key bypass input, panic/emergency input, ground, and low voltage output 112 ports of controls connector 115 in FIG. 11). Controls terminal block 125 is similar to high voltage terminal block 124 and provides electrical pathways between respective ports on the controls connector 115 and the respective input and output wires attached to the controls terminal block 125. Electrical pathways are established on the circuit board 108 to connect the respective input and output ports of controls connector 115 to appropriate components of the circuit board 108. For example, the circuit board 108 may include pathways or other connections between the power supply 118 and the ground port and low voltage output port 112. Connections between other ports of controls connector 115 and other components of circuit board 108 are also made, as necessary.

Figure 11:
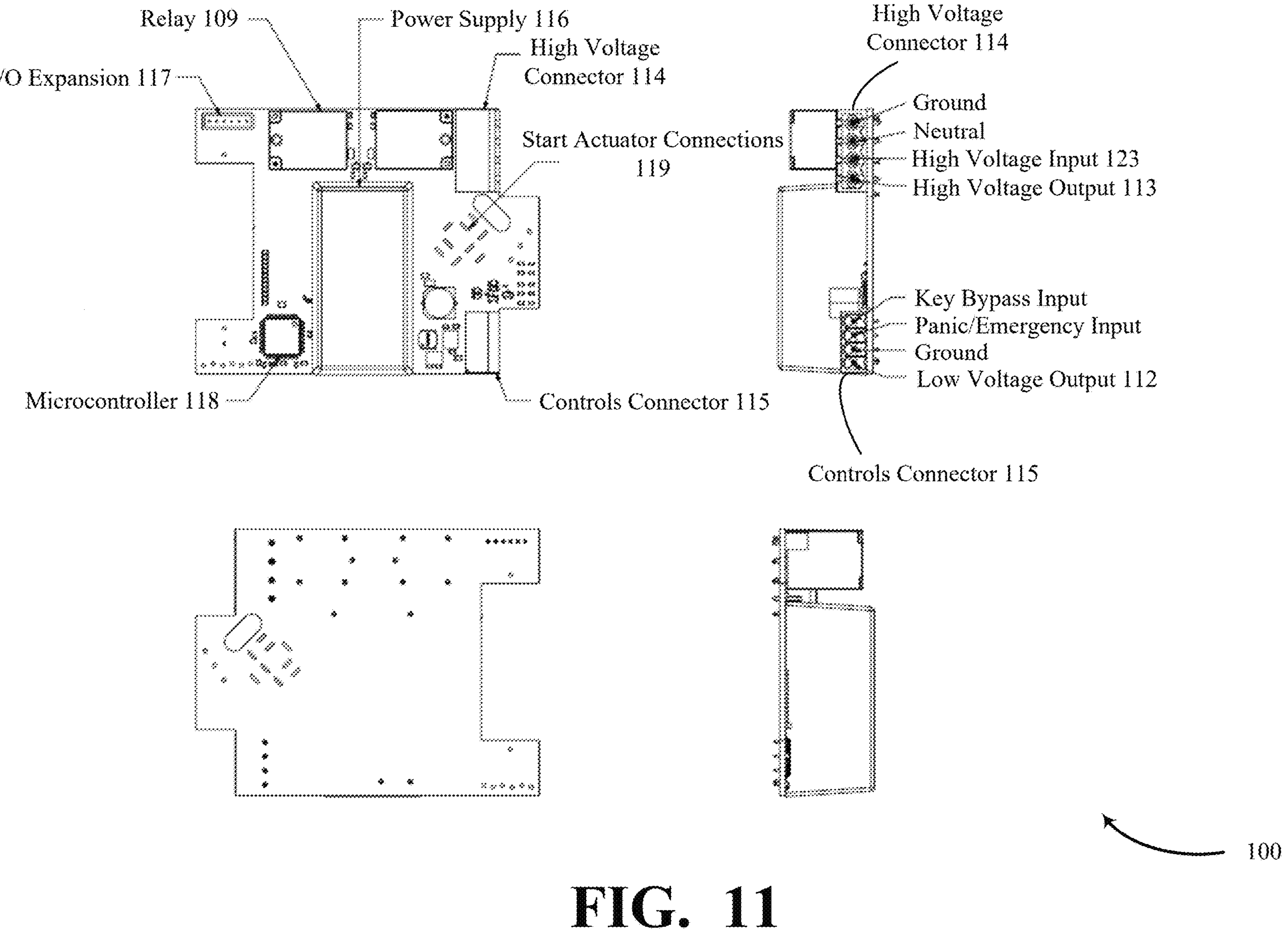
FIG. 11 depicts (clockwise from top-left) front, right, left-side, and back views of a circuit board and certain components of the apparatus of FIG. 1.
Figure 12:
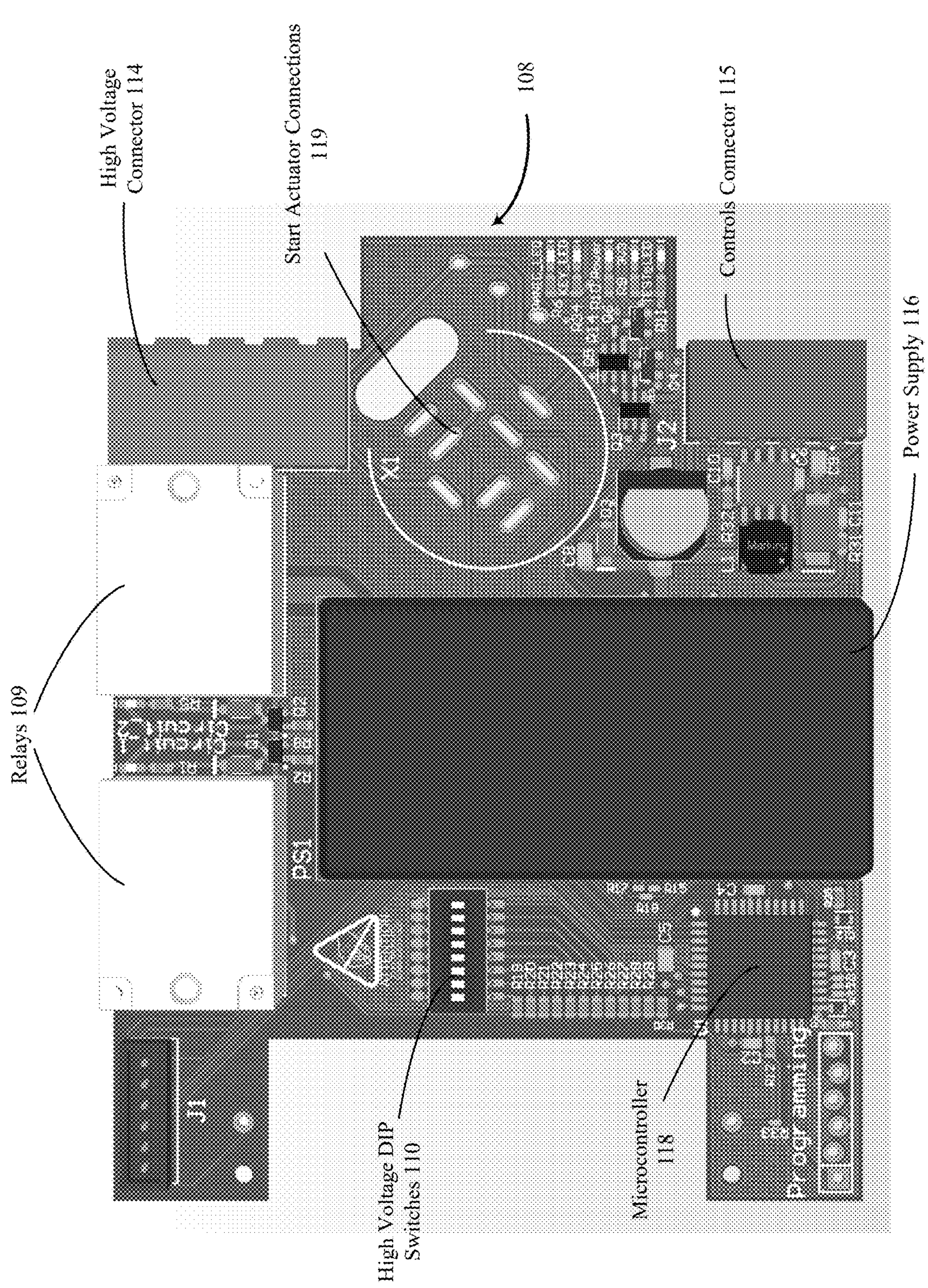
FIG. 12 is a front view of the circuit board and certain related components.
Figure 13:
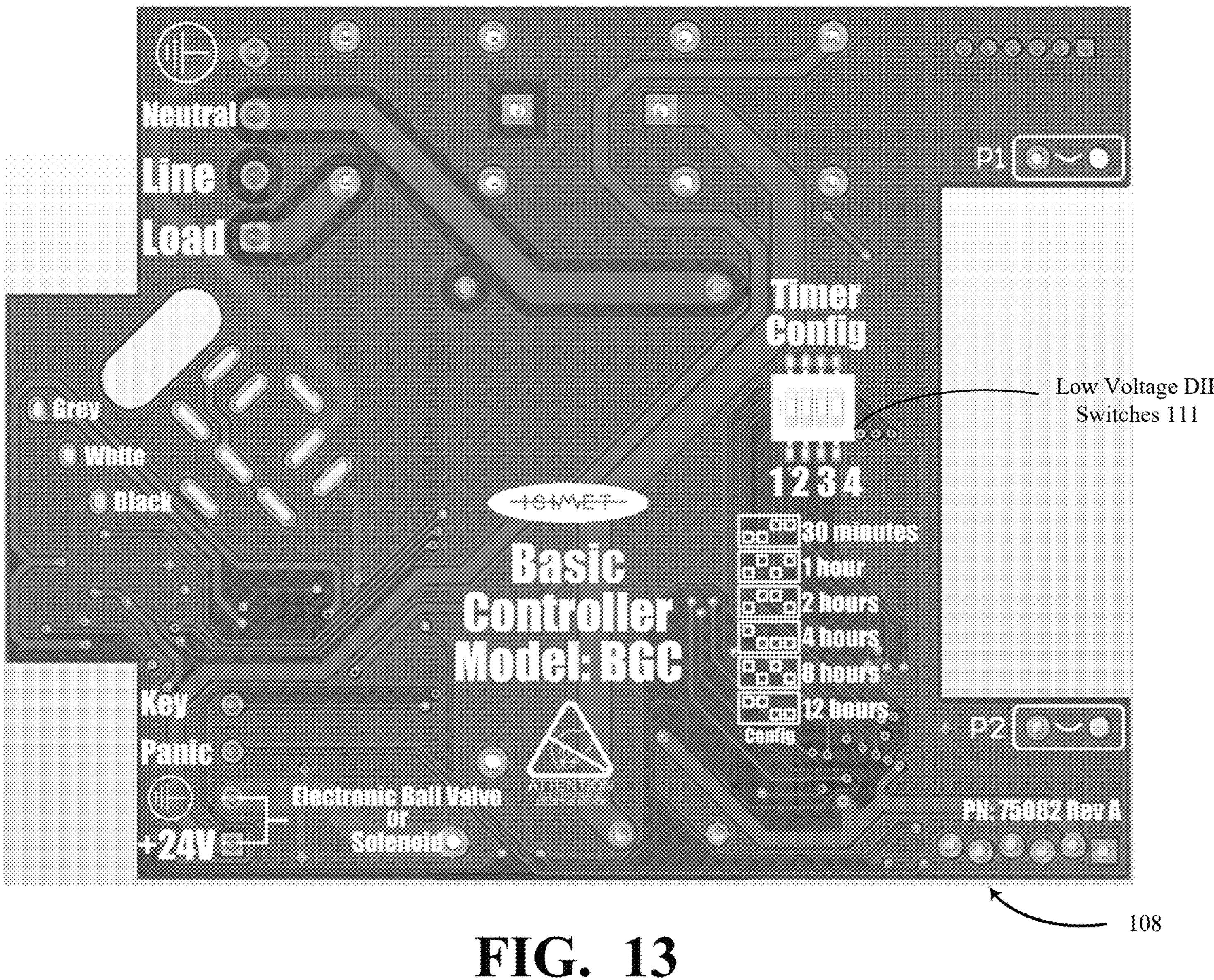
FIG. 13 is a back view of the circuit board and certain related components.
Figure 14:
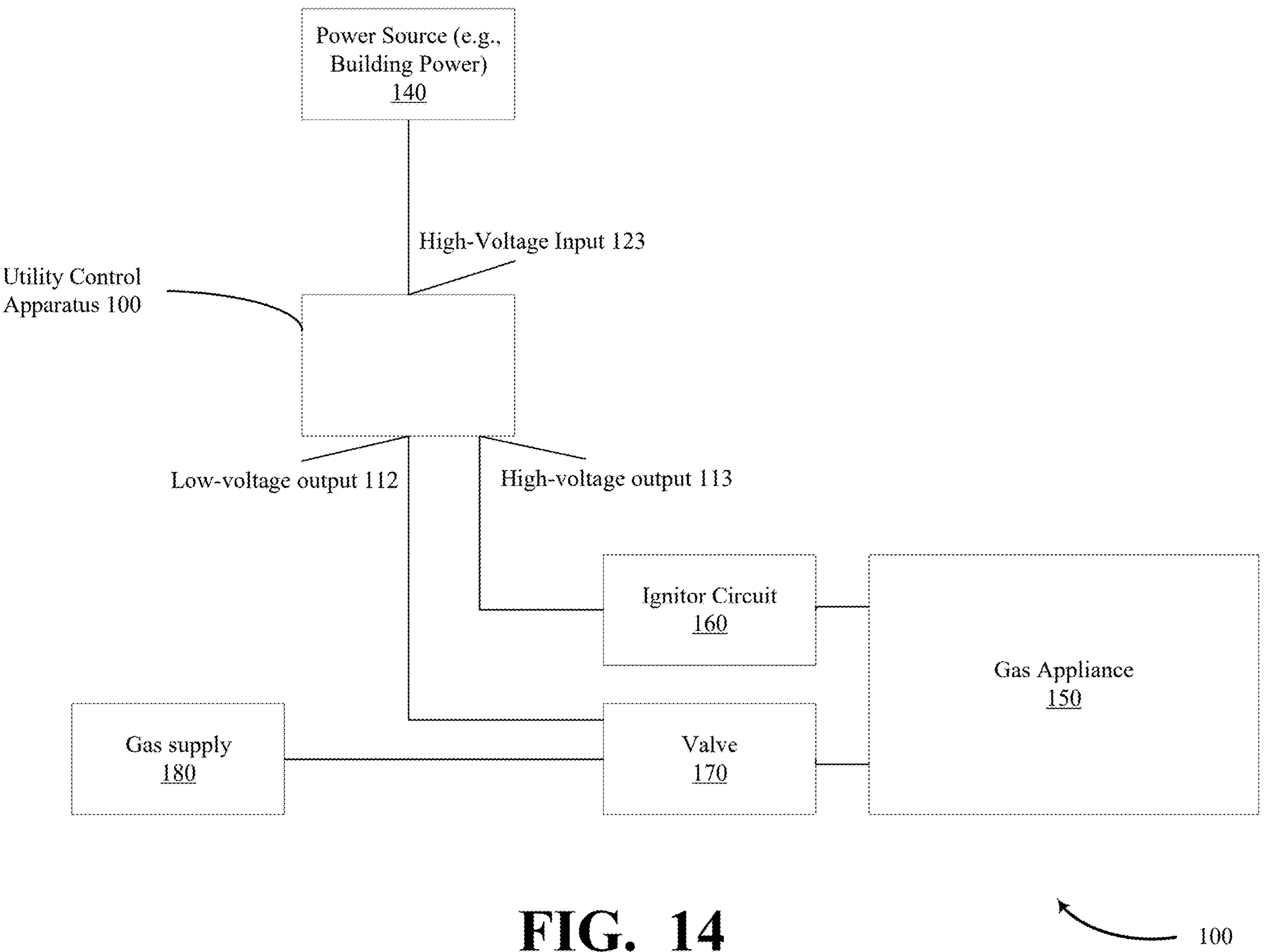
FIG. 14 is a schematic depiction of an example environment in which the apparatus for utility control may operate.

With respect to the ports of controls connector 115 shown in the example of FIG. 11, the key bypass input allows for override of utility control apparatus 100 using a key. The panic/emergency input may comprise the input for the wire 120 from contact block 104 so that stop button 102 is electrically coupled to circuit board 108. In other examples, the contact block 104 may be separately connected to the circuit board 108, and the panic/emergency input may be connected to a building management system that may provide a signal to cause the utility control apparatus 100 to shut off the utility. The low voltage output 112 may connect through a corresponding port on controls terminal block 125 to a wire that carries the control signal for the valve 170, as previously described. The inputs and outputs of controls connector 115 may be in different locations or in a different order than those presented in the Figures.

As discussed, when the front cover 106 is detached from the protective enclosure 101, all of the elements attached thereto (e.g., stop button 102, start button 107, contact block 104, locking collar 103, circuit board 108, power supply 116, etc.) may be lifted out of the protective enclosure 101 as a unit. Because all of the external wire connections are made to high voltage terminal block 124 and/or controls terminal block 125, the entire unit can be repaired/replaced simply by removing the front cover and unsnapping the terminal blocks 124, 125 from their respective connectors 114, 115. When a new or repaired unit is reinstalled, the existing terminal blocks 124, 125 (with their already-wired connections) can be reattached to the respective connectors 114, 115 of the new or repaired circuit board, and the front cover can be reattached without disturbing the protective enclosure 101 or requiring any rewiring.

The ignitor circuit 160 may comprise a device that uses an electric spark or heat to ignite gas and start a combustion process. In one example, an ignitor circuit 160 includes two electrodes that are connected to the high voltage output 113 of the utility control apparatus 100, and ignitor circuit 160 may receive gas from valve 170 for ignition. The electrodes may be placed in the vicinity of the gas output from gas appliance 150 (fed through valve 170). When the ignitor circuit 160 is activated (e.g., after a press of start button 107), a high voltage charge is sent to the electrodes, creating a spark that jumps across the gap between them. The spark ignites the gas that flows from valve 170, producing a flame at gas appliance 150.

In other examples, a glow plug may be used as the ignitor circuit 160. A glow plug is a device that uses an electric current to heat up a metal element, which may then ignite gas. In examples, the glow plug includes a heating element that is enclosed in a metal casing and connected to the high voltage output port 113 of the utility control apparatus 100. The heating element may be placed in the vicinity of the gas output from gas appliance 150 (fed through valve 170). When the high voltage output is present and the glow plug is activated, an electric current flows through the heating element, causing it to heat. The heat from the glow plug eventually ignites the gas output from the gas appliance 150. As discussed, the predetermined time period during which power is provided to the glow plug may be controlled using the high voltage DIP switches 110. In some examples, the predetermined time period for the ignitor circuit 160 may be on the order of seconds, such as 1 second, 5 seconds, 10 seconds, or any other period of time.

Power supply 116 converts incoming high voltage current (e.g., AC) to direct current low voltage (e.g., DC) and powers circuit board 108. In examples, power supply 116 comprises one or more AC/DC converter, transformer, filter, regulator, rectifier, etc., as is customary and required. Among other functions, power supply 116 converts the high voltage AC input (e.g., from high voltage input 123 on the high voltage connector 114) to a low voltage DC output that is suitable for circuit board 108, and/or control signals to the valve 170.

Power supply 116 is physically attached to circuit board 108 and extends away from circuit board 108 towards front cover 106. The power supply 116 may overlap in a depth direction (e.g., a direction orthogonal to the circuit board 108) with one or more of stop button 102 and start button 107. As such, an end of the power supply that is distal from the circuit board 108 may be positioned between the internal portions of the stop button 102 and start button 107 or between the locking collar 103 and the start button 107. In other examples, the internal portions of both of the start button 107 and start button 102 may be positioned to one side of the power supply 116.

The solenoid valve is an electro-mechanical device that uses an electrical current to create a magnetic field and move a plunger inside the valve. The plunger opens or closes an orifice that allows or prevents the flow of gas (or any other utility fluid) through the valve. The solenoid valve can be normally open (NO) or normally closed (NC), depending on the default position of the plunger when the valve is not energized.

In some examples, valve 170 may alternatively be an electronic ball valve. Valve 170 may refer to either the solenoid valve and/or the electronic ball valve. An electronic ball valve is a type of motorized valve that uses an electric motor to rotate a ball inside the valve. The ball has a hole that aligns or misaligns with the flow direction, allowing or blocking the flow of gas (or any other utility fluid) through the valve. An electronic ball valve can be used for on/off control or flow regulation, depending on the shape and size of the hole in the ball. An electronic ball valve can have a standard port, a full port, or a v-port, which have different flow characteristics.

In some examples, the timer for the valve 170, and the timer for the ignitor circuit 160, may be separately controlled (e.g., the timers may be separate circuits) but physically included on the single circuit board 108. For example, the timer for the valve 170, the timer for the ignitor circuit 160, the stop button, and the start button may be combined into a single utility control apparatus 100. In examples, microcontroller 118 controls the timers for valve 170, and for the ignitor circuit 160 based on settings of high voltage DIP switches 110 and low voltage DIP switches 111. As described previously, microcontroller 118 generates a timer signal based on the timer settings from the high voltage DIP switches 110 and provides the timer signal to the respective relay 109 to turn off or on high voltage output 113. Microcontroller 118 generates a timer signal based on the timer settings from the low voltage DIP switches 111 and provides the timer signal to the respective relay 109 to turn off or on low voltage output 112. In examples, when stop button 102 is pressed, microcontroller 118 receives a signal from stop button 102 (e.g., via contact block 104 and wire 120) and provides a signal to one or both of relays 109 to turn off high voltage output 113 and/or low voltage output 112. In some examples, once stop button 102 is pressed, microcontroller prevents the pressing of start button 107 from turning ON high voltage output 113 and/or low voltage output 112 via relays 109 until stop button 102 is unpressed or reset. In other examples, the high voltage output signal and/or a low voltage output signal may be initiated by a subsequent push of the start button 107 (without a reset of the stop button 102).

As discussed, start actuator connections 119 interface with one or more prongs 121 of start button 107 (e.g., which may alternatively be a key switch). Start actuator connections 119 are a part of circuit board 108 and provide signals from start button 107 or a key switch to microcontroller 118 or other components of the circuit board 108. In some examples, prongs 121 of start button 107 may be soldered to circuit board 108 when inserted into start actuator connections 119. In some examples, the start button connections may be different from the key switch connections. As such, by providing both types of start actuator connections 119 on the circuit board 108, both types of start actuators can be accommodated without requiring a change to the circuit board 108. For example, start button 107 could be switched out for a key switch without changing circuit board 108.

The positions of the electrical components within protective enclosure 101 provide enhanced serviceability and space efficiency in standard-enclosure sized spaces (e.g., a double gang box). For example, power supply 116 may be generally positioned in the center of circuit board 108, between an interior portion of stop button 102 and an interior portion of start button 107, and near a lower edge of circuit board 108. Other positions of the power supply 116 are possible and contemplated. For example, power supply 116 could be moved towards a side of the circuit board 108, and the start button 107 and stop button 102 could be moved to be closer together. Power supply 116 may face the front cover 106. In some examples, some or all of the electrical components including relays 109, power supply 116, high voltage connector 114, controls connector 115, microcontroller 118, high voltage DIP switches 110, and/or low voltage DIP switches 111 may be facing front cover 106. In some examples, one or both of high voltage DIP switches 110 and low voltage DIP switches 111 may be located on an opposite side (e.g., a side facing away from front cover 106) to easily modify or service the DIP switches. In some examples, relays 109 may be substantially adjacent to power supply 116. In some examples, microcontroller 118 may be substantially adjacent to power supply 116.

In addition, although examples of the present disclosure have depicted a separate start actuator (e.g., start button 107) and stop actuator (e.g., stop button 102), it will be appreciated that the start and stop functions may be combined in a single start/stop actuator. For example, stop button 102 may be omitted, and the start button 107 (or other actuator) may be used to signal both start and stop for valve 170 and/or ignitor circuit 160, among other possibilities. In examples, a combined start/stop actuator may (similar to start button 107) include a visual indicator to indicate a current state of the utility. Utility control apparatus 100 may interpret successive presses (or other actuations) of a start/stop actuator as toggling or cycling through successive states. E.g., an actuation of the start/stop actuator while the utility is in an OFF state, may cause the utility control apparatus 100 to send signals causing both the valve 170 to open and the ignitor circuit 160 to turn ON. In addition, timers for both the valve 170 and the ignitor circuit 160 may be initiated, as previously described. Alternatively, detecting actuation of the start/stop actuator while the utility is in the ON state may cause the utility control apparatus 100 to send a signal causing the valve 170 to close, while discontinuing any high voltage signal to the ignitor circuit 160 that is then active. Examples of using a single actuator to cycle through additional states are possible and contemplated.

As discussed, in some examples, power supply 116 may overlap in a depth direction with one or more of the start actuator (e.g., start button 107) and the stop actuator (e.g., stop button 102) (or a start/stop actuator, as applicable). For example, a reference plane that is substantially parallel to the front cover 106 or to the circuit board 108 and tangential to an end of the power supply 116 that is distal from the circuit board 108 may intersect one or both of the interior portion of the start button 107 and the interior portion of the stop button 102 (or an interior portion of a start/stop actuator, as applicable). In other examples, the previously described reference plane may intersect the interior portion of the start button 107 and the locking collar 103.

In examples, overlapping the depth of the power supply 116 (which may be the largest component on the circuit board 108) with at least one of the interior portions of start actuator (e.g., start button 107) or stop actuator (e.g., stop button 102) (or start/stop actuator, as applicable) permits the circuit board 108 to be closer to the front cover 106. This, in turn, permits the circuit board to be connected to the front cover 106 (and not the protective enclosure 101), while maintaining enough room behind the circuit board (towards the back wall of protective enclosure 101) for one or more wires (e.g., a high voltage input wire) to be threaded into the protective enclosure and connected to the circuit board 108 (e.g., via terminal block 124 and connector 114).

Among other advantages, this configuration enables serviceability of the electrical components simply by removing front cover 106 (and all the components attached thereto). For example, one or all of the front cover 106, start button 107, stop button 102, stop/start actuator (as applicable), contact block 104, locking collar 103, circuit board 108, controls connector 115, high voltage connector 114, power supply 116, relays 109, I/O expansion 117, high voltage DIP switches 110, low voltage DIP switches 111, microcontroller 118, and start actuator connections 119 can be removed together as a unit when the front cover 106 is detached from the protective enclosure 101. One or more elements can then be repaired or replaced (e.g., as a single unit or separately) with new respective components without disturbing protective enclosure 101. In some examples, no electrical components are directly attached to protective enclosure 101. Rather, only the front cover 106 is attached to the protective enclosure 101 (optionally with gasket 105 therebetween). In some examples, high voltage connector 114 and/or controls connector 115 may face a direction substantially parallel to front cover 106. For example, high voltage connector 114 and/or controls connector 115 may both face a same (or a different) side inside surface of protective enclosure 101. Side inside surfaces may refer to surfaces that are substantially perpendicular to front cover 106. Because the circuit board is configured to be not as wide as the protective enclosure 101 (and suspended away from the back wall of the protective enclosure), adequate space is provided for wires (e.g., high voltage input wires) to be threaded into the protective enclosure 101 (e.g., through an opening in the back wall of the protective enclosure 101). Such wires can be connected to respective wire connectors of terminal blocks 124, 125, and connected to respective connectors 114, 115 without requiring severe 270 degree turns that would be required if the connections were made to a connector facing the front cover 106. This can prevent damage to wires and connectors and increase the reliability of connections. Further, excess wire can be looped and pooled in the space between the circuit board and the back wall of the protective enclosure 101.

Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A utility control apparatus, comprising:

a front cover configured to cover at least a portion of a protective enclosure;

a start actuator, wherein the start actuator:

comprises at least a first exterior portion accessible from an exterior of the front cover and a first interior portion extending away from an interior surface of the front cover; and is configured, when activated, to cause the utility control apparatus to signal a valve controlling flow of a fluid to permit the flow of the fluid;

a stop actuator, wherein the stop actuator:

comprises at least a second exterior portion accessible from the exterior of the front cover and a second interior portion extending away from the interior surface of the front cover; and is configured, when activated, to cause the utility control apparatus to signal the valve controlling flow of a fluid to stop the flow of the fluid;

a circuit board attached to at least one of the start actuator and the stop actuator and electrically connected to the start actuator and the stop actuator; and a power supply, attached to the circuit board and extending away from the circuit board towards the front cover, wherein an end of the power supply distal from the circuit board overlaps in a depth direction with at least one of the first interior portion and the second interior portion.

2. The utility control apparatus of claim 1, wherein the stop actuator and the start actuator are attached to the front cover.

3. The utility control apparatus of claim 2, wherein the utility control apparatus includes an attachment mechanism to releasably attach the front cover to the protective enclosure, and wherein when the start actuator, stop actuator, circuit board, and power supply may be removed from the protective enclosure as a unit by removing the front cover from the protective enclosure.

4. The utility control apparatus of claim 1, wherein the start actuator comprises a start button, and the stop actuator comprises one of a mushroom button, a flush mount button, and a keyed reset button.

5. The utility control apparatus of claim 1, further comprising:

a locking collar coupled to the stop actuator and securing the stop actuator to the front cover, wherein the front cover is disposed between the locking collar and the first exterior portion; and a contact block coupled to the locking collar, the contact block electrically connecting the circuit board to the stop actuator.

6. The utility control apparatus of claim 5, wherein the start actuator comprises a plurality of prongs configured to electrically couple the start actuator to the circuit board, and wherein the plurality of prongs extend through the circuit board.

* * * * *